United States Patent [19]

Rhein et al.

[11] Patent Number: 5,356,174
[45] Date of Patent: Oct. 18, 1994

[54] VEHICLE AIRBAG ASSEMBLY

[75] Inventors: John F. Rhein, Hamburg, N.Y.; Theodore J. Bachelder, Romeo; Russell E. Stein, Mt. Clemens, both of Mich.

[73] Assignee: TRW Vehicle Safety Systems Inc., Lyndhurst, Ohio

[21] Appl. No.: 59,225

[22] Filed: May 6, 1993

[51] Int. Cl.$^5$ ............................................. B60R 21/16
[52] U.S. Cl. ........................... 280/728 A; 280/728 B; 280/732
[58] Field of Search .......... 280/728 R, 728 A, 728 B, 280/731, 732, 743 R

[56] References Cited

U.S. PATENT DOCUMENTS

| | | | |
|---|---|---|---|
| 3,843,150 | 10/1974 | Harada et al. | 280/729 |
| 4,111,457 | 9/1978 | Kob et al. | 280/728 A |
| 4,913,461 | 4/1990 | Cuevas | 280/731 |
| 4,986,569 | 1/1991 | Bruton | 280/728 B |
| 4,988,119 | 1/1991 | Hartmeyer | 280/728 A |
| 5,064,218 | 11/1991 | Hartmeyer | 280/728 A |
| 5,069,480 | 12/1991 | Good | 280/728 A |
| 5,074,584 | 12/1991 | Jarboe | 280/728 A |
| 5,096,222 | 3/1992 | Komerska et al. | 280/732 |
| 5,184,843 | 2/1993 | Berger et al. | 280/728 A |

FOREIGN PATENT DOCUMENTS

| | | | |
|---|---|---|---|
| 356247 | 12/1992 | Japan | 280/728 A |
| 2251222 | 7/1992 | United Kingdom | 280/728 A |

Primary Examiner—Kenneth R. Rice
Attorney, Agent, or Firm—Calfee Halter & Griswold

[57] ABSTRACT

An apparatus for forming a vehicle airbag assembly includes a reaction device (12) and an airbag/retainer subassembly (14). The airbag/retainer subassembly (14) includes an airbag (16) and a retainer (18) which are joined together by airbag mating members (42) and complementary retainer mating members (62) in a predetermined alignment. In this predetermined alignment, apertures (38) formed in the airbag (16) are aligned with apertures (68) formed in the retainer (18). The reaction device (12) may include mating members (84) which form a cradle configured to engage the airbag/retainer subassembly (14) and to align the airbag/retainer subassembly (14) in a predetermined orientation. In this predetermined orientation, apertures (82) formed in the reaction device (12) will be aligned with the already aligned apertures (38, 68) of the airbag (16) and the retainer (18). In the completed airbag assembly, suitable fasteners, such as rivets, may be inserted through the aligned apertures (38, 68, 82) to couple the airbag (16) and the retainer (18) to the reaction device (12).

30 Claims, 4 Drawing Sheets

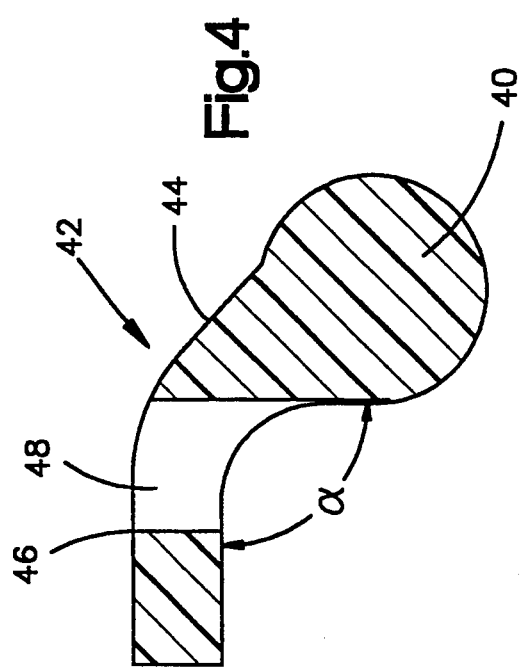
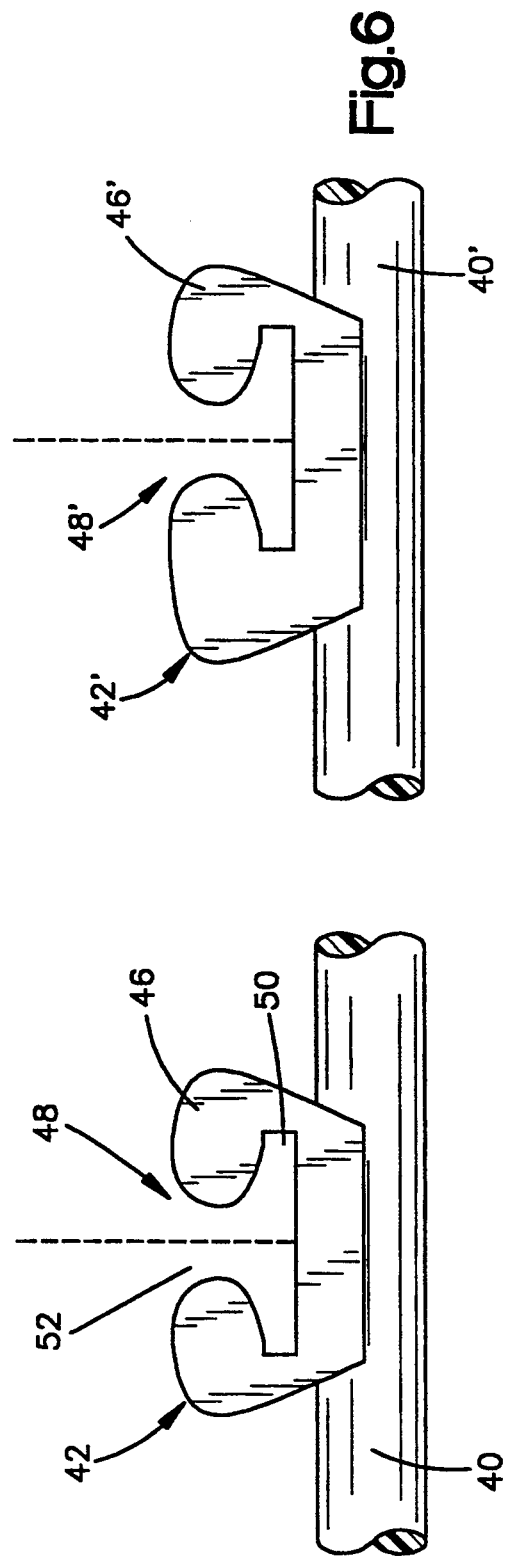

VEHICLE AIRBAG ASSEMBLY

FIELD OF THE INVENTION

The present invention relates generally to a vehicle airbag assembly. More particularly, the present invention relates to structures and techniques for effectively coupling an airbag and a retainer to a reaction device while at the same time eliminating the need for preliminary alignment procedures. Specifically, the airbag, the retainer, and the reaction device are provided with mating members which, when appropriately mated or engaged, insure that the relevant coupling components (rivet-receiving apertures in the preferred embodiment) are properly aligned.

BACKGROUND AND SUMMARY OF THE INVENTION

A vehicle airbag assembly typically comprises a reaction device and an airbag which is coupled to the reaction device. The reaction device is commonly adapted to be mounted to a structural part of a vehicle. For example, a passenger-side airbag is usually designed to be incorporated into the dashboard or instrument panel of a vehicle. One common form of a reaction device is a "reaction can" or, in other words, a wall structure forming a container which at least partially encloses the airbag.

The airbag includes an inflatable bag which is made of a suitable flexible fabric, such as nylon, and which includes a mouth defining a fluid inlet. The bag is adapted to be inflated to a desired configuration. If the bag was to be used in a passenger-side airbag assembly, it would probably be designed to be inflated into a generally cylindrical or drum-like shape.

An airbag assembly additionally typically includes an inflator and a cover which are also coupled to the reaction device. The inflator will usually comprise a housing enclosing a source of inflation fluid. The cover will usually be designed to separate into segments during deployment of the airbag.

When mounted to a vehicle, an airbag assembly operates to deploy the airbag at the onset of a vehicle collision. Specifically, at the onset of a collision, the inflator supplies inflation fluid to the inflatable bag. This supply of inflation fluid expands the bag to sequentially (although almost instantaneously) create an opening in the cover, force the bag through the opening into the occupant compartment, and fully inflate the bag to cushion an occupant against impact with a structural part of the vehicle.

As was indicated above, the airbag is typically coupled to the reaction device. In designing the airbag assembly of the present invention, applicants appreciated that this coupling could be accomplished by inserting suitable fasteners, such as rivets, through apertures in the mouth of the inflatable bag and aligned apertures in the reaction device. However, applicants also appreciated that, while this coupling process has proven to be effective, it frequently requires preliminary alignment procedures. More specifically, the airbag and/or the reaction device must often be manually manipulated and visually inspected during the preliminary stages of the coupling process to ensure that the apertures in the bag's mouth are properly aligned with the apertures in the reaction device. Thus, in designing the airbag assembly of the present invention, applicants wanted to use this effective method of coupling the airbag to the reaction device but also wanted to eliminate the need for preliminary alignment procedures.

In designing the airbag assembly of the present invention, applicants additionally wanted to incorporate a separate retainer, such as a frame-shaped component, into the airbag assembly. Applicants appreciated that such a retainer could be provided with apertures which were arranged to align with the apertures in the bag's mouth and with the apertures in the reaction device. In this manner, suitable fasteners, such as rivets, could be inserted through the aligned apertures in the reaction device, the bag's mouth, and the retainer to couple the airbag and the retainer effectively to the reaction device. Applicants also appreciated, however, that the introduction of a retainer could undesirably further complicate the preliminary alignment procedures of the coupling process.

Accordingly, an object of the present invention is to provide structures and techniques for effectively coupling an airbag and a retainer to a reaction device while at the same time eliminating the need for preliminary alignment procedures. This objective is accomplished by providing the airbag, the retainer, and the reaction device with mating members which, when appropriately mated or engaged, insure that the relevant coupling components (rivet-receiving apertures in the preferred embodiment) are properly aligned.

More particularly, the present invention provides a method of forming an airbag assembly comprising the steps of providing an airbag, providing a retainer, and providing a reaction device. The airbag includes an inflatable bag and airbag mating members which are attached to, and extend away from, the mouth of the inflatable bag. Preferably, the airbag mating members are part of a mating device which is incorporated into the bag's mouth. The retainer includes a base member and retainer mating members which are attached to, and extend away from, the base member. The retainer mating members are complementarily configured to mate with the airbag mating members.

In forming the airbag assembly, the airbag is joined to the retainer to form an airbag/retainer subassembly. Specifically, the airbag mating members are mated with the retainer mating members, thereby joining the airbag to the retainer in a predetermined alignment. In this predetermined alignment, the relevant coupling components of the airbag and the retainer (i.e., rivet-receiving apertures) are properly aligned. Thus, the mating of the airbag mating members with the retainer mating members simultaneously aligns the relevant coupling components of the airbag and the retainer so that preliminary alignment procedures are not necessary.

The airbag/retainer subassembly is then positioned in a predetermined orientation relative to the reaction device and thereafter coupled to the reaction device. In this predetermined orientation, the relevant coupling components of the reaction device (i.e., rivet-receiving apertures) are properly aligned with the relevant coupling components of the airbag and the retainer (i.e., already aligned rivet-receiving apertures). The reaction device preferably includes a cradle configured to engage the airbag/retainer subassembly and to align the airbag/retainer subassembly in the predetermined orientation. In this manner, the engagement of the airbag/retainer subassembly with the cradle simultaneously aligns the relevant coupling components so that preliminary alignment procedures are not necessary.

The reaction device may comprise a "reaction can" or, in other words, comprise a wall structure forming a container and defining a front opening. If the airbag assembly of the present invention includes such a reaction device, the positioning of the airbag/retainer subassembly may include inserting it through the front opening into the container. If the reaction device includes a cradle, the cradle would be preferably formed in one piece with the wall structure.

The method of the present invention may be used in conjunction with suitable fasteners, such as rivets, to couple the airbag and the retainer effectively to the reaction device while at the same time eliminating the need for preliminary alignment procedures. For example, the inflatable bag could be provided with apertures which are disposed at predetermined locations relative to the airbag mating members. Additionally, the base member of the retainer could be provided with apertures which are disposed at predetermined locations relative to the retainer mating members and which are arranged to align with the bag's apertures in the completed airbag/retainer subassembly. When the airbag mating members are mated with the retainer mating members, the apertures in the inflatable bag would be simultaneously aligned with the corresponding apertures in the retainer.

Furthermore, the reaction device could be provided with apertures which are arranged to align with the aligned apertures in the inflatable bag and the retainer when the airbag/retainer subassembly is positioned in the predetermined orientation. The fasteners could then be inserted through the aligned apertures of the inflatable bag, the retainer, and the reaction device so that these fasteners could be used to couple the airbag and the retainer to the reaction device. If the reaction device includes a cradle, the apertures in the reaction device would be simultaneously aligned with the aligned apertures of the inflatable bag and the retainer when the airbag/retainer subassembly is engaged with the cradle.

Thus, an airbag/retainer subassembly according to the present invention comprises an airbag and a retainer which are joined together by airbag mating members and complementary retainer mating members. As was indicated above, the airbag mating members may be part of a mating device. Such a mating device preferably comprises a ring-shaped base member which is incorporated into the mouth of the inflatable bag and which is formed in one piece with the airbag mating members. More preferably, the mating device consists essentially of a one-piece molded plastic article and, even more preferably, the one-piece molded plastic article is made of nylon.

In an airbag assembly according to the present invention, the airbag/retainer subassembly is coupled to a reaction device. If the reaction device includes a cradle, this cradle engages the airbag/retainer subassembly and supports the airbag/retainer subassembly in the predetermined orientation. If the relevant coupling components constitute apertures, the airbag/retainer subassembly is coupled to the reaction device by suitable fasteners, such as rivets, which are inserted through the aligned apertures of the inflatable bag, the base member of the retainer, and the reaction device.

BRIEF DESCRIPTION OF THE DRAWINGS

In the annexed drawings:

FIG. 4 is an enlarged sectional view of an airbag mating member as seen along line 4—4 in FIG. 2;

FIG. 5 is an enlarged top view of an airbag mating member as seen along line 5—5 in FIG. 2; and FIG. 6 is a view similar to FIG. 5 except that it shows a modified form of the airbag mating member.

DETAILED DESCRIPTION

Figure 1:
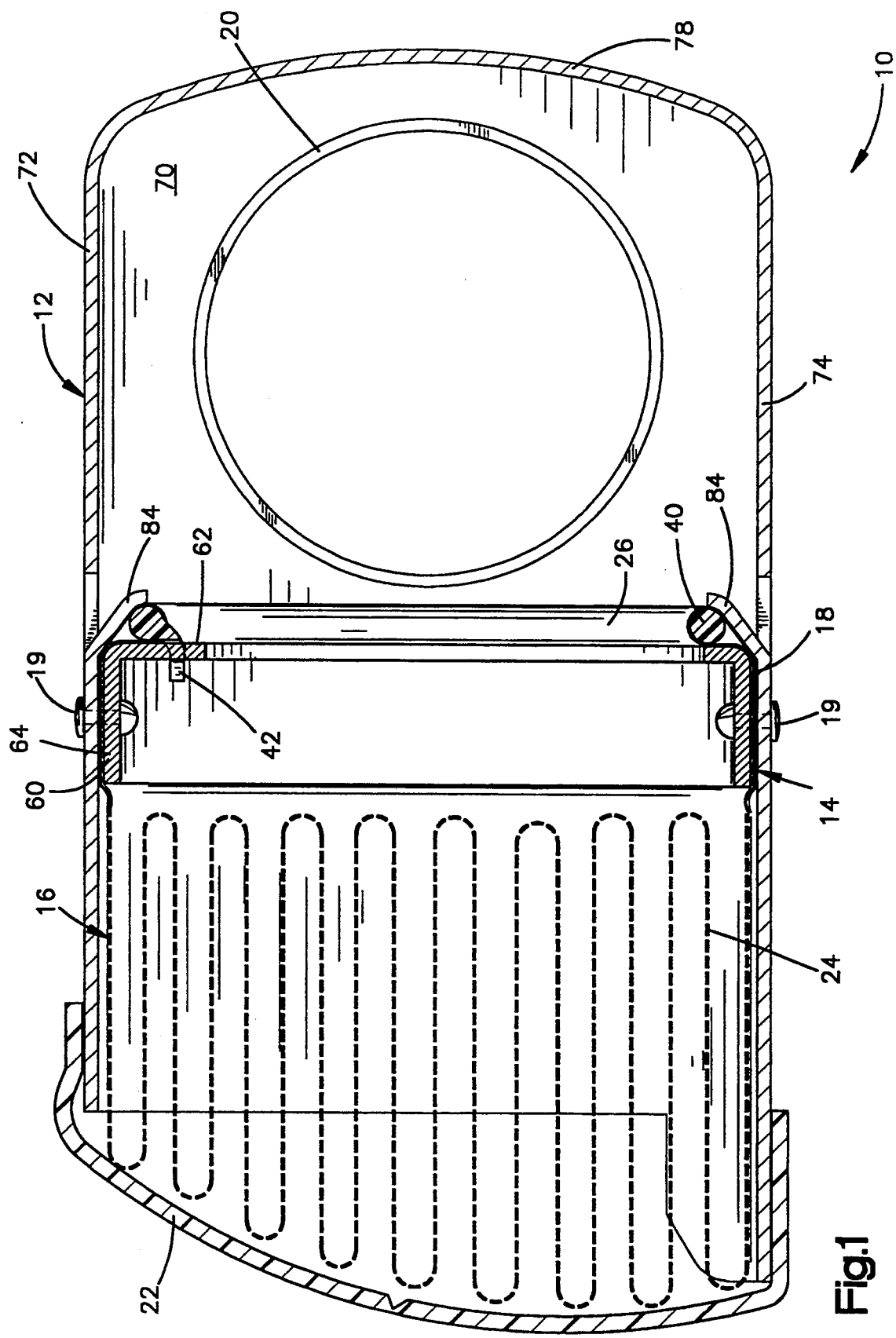
FIG. 1 is a schematic sectional view of an airbag assembly according to the present invention, the airbag assembly comprising a reaction device and an airbag/retainer subassembly coupled to the reaction device.

Referring now to the drawings in detail and initially to FIG. 1, an airbag assembly 10 according to the present invention is shown. The airbag assembly 10 comprises a reaction device 12 and an airbag/retainer subassembly 14. The airbag/retainer subassembly 14 includes an airbag 16 and a retainer 18 which is joined to the airbag 16. As is explained in more detail below, the airbag 16 and the retainer 18 are coupled to the reaction device 12 via suitable fasteners, such as rivets 19. The rivets 19 extend through aligned rivet-receiving apertures in the reaction device 12, the airbag 16, and the retainer 18. As is also explained in more detail below, the reaction device 12, the airbag 16 and the retainer 18 have mating members which, when properly mated or engaged, eliminate the need for preliminary alignment procedures when coupling the airbag 16 and the retainer 18 to the reaction device 12.

The airbag assembly 10 additionally comprises an inflator 20 and a cover 22. The inflator 20 includes an elongated cylindrical housing (i.e., it has an axial dimension substantially greater than its radial dimension) enclosing a source of inflation fluid. The cover 22 is designed to separate into segments during deployment of the airbag 16. Although not specifically shown in FIG. 1, the inflator 20 and the cover 22 are coupled to the reaction device 12 in a suitable manner.

Figure 2:
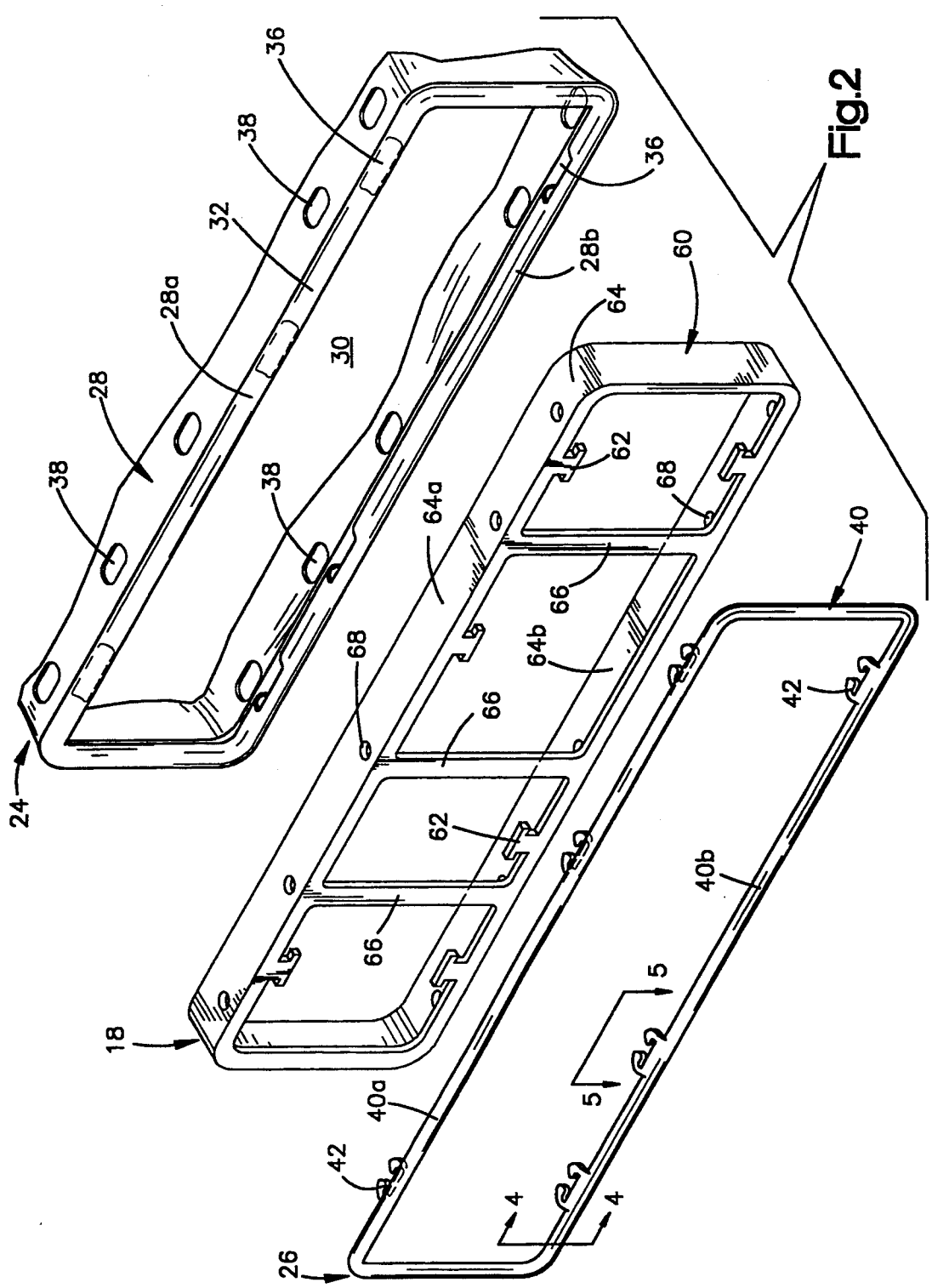
FIG. 2 is an exploded, perspective view of the components forming the airbag/retainer subassembly, namely an inflatable bag, a mating device (including airbag mating members), and a retainer.

Referring now additionally to FIG. 2, the components of the airbag/retainer subassembly 14 are illustrated in detail. As was indicated above, the airbag/retainer subassembly 14 includes an airbag 16 and a retainer 18. The airbag 16 includes an inflatable bag 24 and a mating device 26. The bag 24 is made of suitable flexible fabric, such as nylon, and is adapted to be inflated to a desired configuration. For example, in the illustrated passenger-side airbag assembly 10, the bag 24 is designed to be inflated into a generally cylindrical or drum-like shape.

The bag 24 includes a mouth 28 defining a fluid inlet 30. In the illustrated and preferred embodiment, the fluid inlet 30, and thus the mouth 28, is roughly rectangular in shape. In the orientation shown in the drawings, the top and bottom surfaces 28a and 28b of the bag's mouth 28 are substantially longer than its lateral surfaces. The mouth 28 includes a hem 32 which forms a channel and which includes openings, or interruptions, 36. The interruptions 36 comprise either breaks in the stitch line forming the hem 32 or, and as illustrated, openings cut in the fabric of the hem 32. As is explained in more detail below, the channel and the interruptions 36 accommodate the mating device 26 in the completed airbag/retainer subassembly 14.

The mouth 28 of the bag 24 additionally includes a plurality of oval rivet-receiving apertures 38 which are disposed at predetermined locations adjacent the channel formed by the hem 32. In the illustrated embodiment, the apertures 38 are located on the mouth's top and bottom surfaces 28a and 28b. In the completed airbag assembly 10, the rivets 19 extend through the rivet-receiving apertures 38.

The mating device 26 includes a relatively rigid ring-shaped base member 40 and relatively rigid mating members 42 which extend away from the base member 40. The mating device 26 preferably consists essentially of a one-piece molded plastic article and, more preferably, this one-piece molded plastic article is made of nylon. Thus, the mating members 42 are preferably formed in one piece with the base member 40.

The base member 40 is circular in cross-section and its overall shape approximates that of the bag's mouth 28. Accordingly, in the illustrated embodiment, the ring-shaped base member 40 has a generally rectangular configuration. Additionally, the top and bottom surfaces 40a and 40b of the base member (in the orientation shown in the drawings) are substantially longer than its lateral surfaces.

The mating members 42 project inwardly from the top and bottom surfaces 40a and 40b of the base member 40 toward the center of the base member. Each mating member 42 includes a proximal section 44 and a distal section 46. The proximal section 44 extends inward from the base member 40. The distal section 46 extends from the proximal section 44 at an angle $\alpha$, this angle $\alpha$ being slightly obtuse in the illustrated and preferred embodiment. (See FIG. 4.) The distal section 46 of each mating member 42 defines a mating slot 48. As is explained in more detail below, these mating slots 48 are configured to mate with mating members of the retainer 18.

The mating slots 48 may consist of "closed" slots, such as rectangular openings. However, in the preferred and illustrated embodiment, the mating slots 48 are "open-ended" slots. (See FIG. 5.) Specifically, each mating slot 48 includes a rectangular portion 50 which tapers into a neck portion 52 to form a roughly T-shaped profile. The slot 48 is centrally located relative to the distal section 46 of the mating member 42. In other words, a centerline (shown as a dashed line in FIG. 5) through the slot 48 is substantially equidistant from opposite surfaces of the distal section 46.

An alternate form 42' of an airbag mating member is shown in FIG. 6. In the airbag mating member 42', the location of the slot 48' is offset relative to the distal section 46'. Thus, a centerline (shown as a dashed line in FIG. 6) through the slot 48' is not equidistant from opposite surfaces of the distal section 46' of the mating member 42'.

Figure 3:
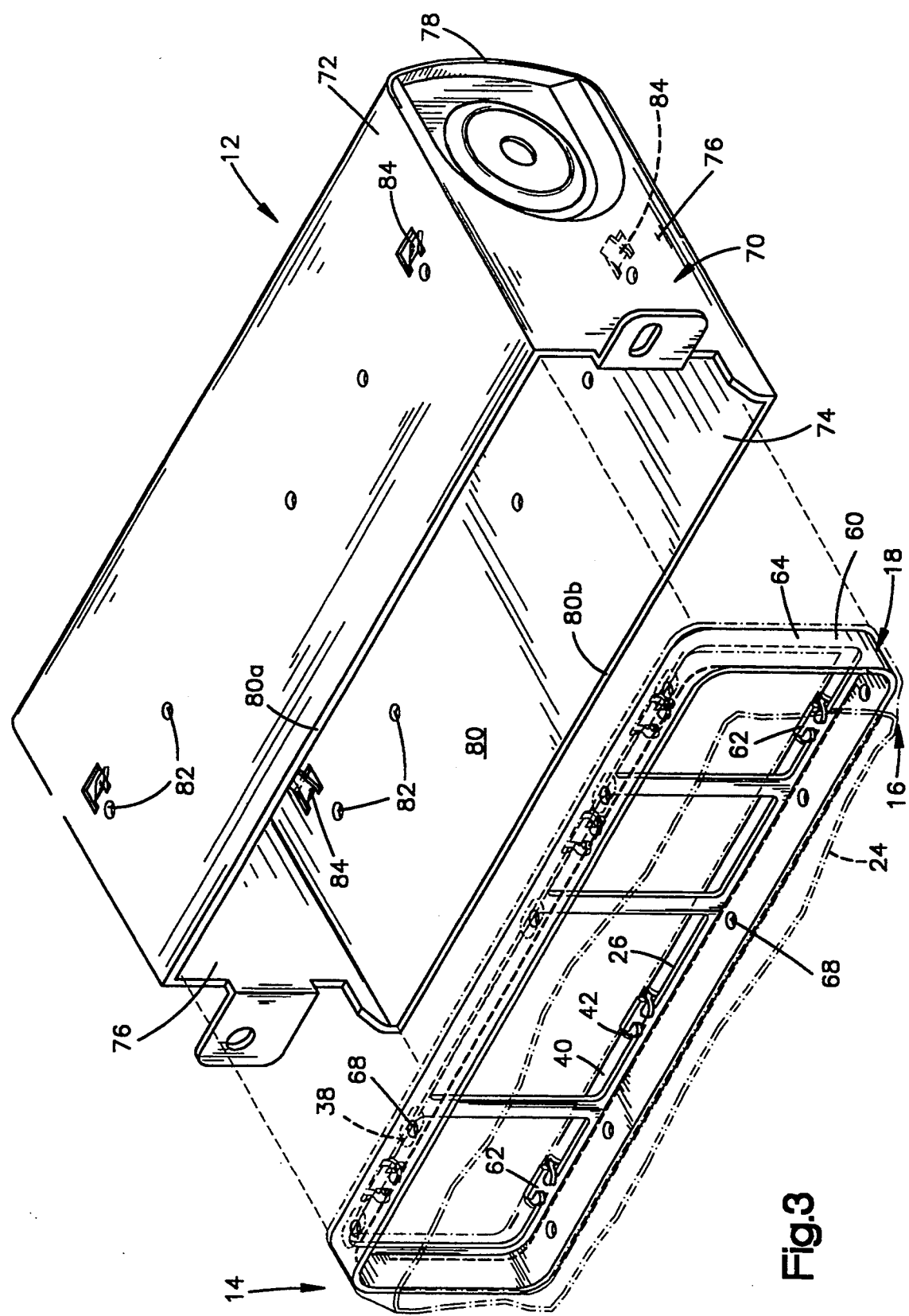
FIG. 3 is an exploded, perspective view of the airbag/retainer subassembly and the reaction device.

The mating device 26 is incorporated into or, in other words, integrally united with, the bag's mouth 28 in such a manner that the mating members 42 extend out of the mouth 28. For example, in the illustrated embodiment, the base member 40 is captured within the channel formed by the hem 32 and the mating members 42 project through the interruptions 36. (See FIG. 3.) In this arrangement, the base member 40 is incorporated into the bag's mouth 28 and the mating members 42 extend into the fluid inlet 30.

The retainer 18 comprises a base member 60 and retainer mating members 62 which are attached to, and extend away from, the base member. The base member 60 is formed from a rigid material, such as steel. The retainer mating members 62 are also formed from a rigid material and preferably formed of the same material as, and in one piece with, the base member 60.

The base member 60 includes a continuous frame 64 which is rectangular in cross-section and its overall shape approximates that of the bag's mouth 28 and/or the mating device's base member 40. Accordingly, in the illustrated and preferred embodiment, the frame 64 has a substantially rectangular configuration and, in the illustrated orientation, has top and bottom surfaces 64a and 64b which are substantially longer than the lateral surfaces of the frame 64.

The base member 60 may additionally include one or more cross-bars 66 which extend between the frame's top and bottom surfaces 64a and 64b. The cross-bars 66 are flush with the front surface (i.e., the surface farthest from the inflator 20 in the completed airbag assembly 10) of the base member 60. In the completed airbag assembly 10, the cross-bars 66 define openings, or windows, through which the inflation fluid will flow during the deployment of the airbag 16. If the base member 60 includes cross-bars 66, they are preferably formed in one piece with the continuous frame 64. Additionally, the cross-bars 66 are preferably situated between the retainer mating members 62 and they preferably define windows of varying widths.

The frame 64 includes a plurality of circular rivet-receiving apertures 68 which are disposed at predetermined locations relative to the mating members 62. In the completed airbag/retainer subassembly 14, the retainer rivet-receiving apertures 68 align with the airbag rivet-receiving apertures 38. In the completed airbag assembly 10, the rivets 19 extend through the aligned apertures 38 and 68, and also, as explained in more detail below, through rivet-receiving apertures in the reaction device 12.

The retainer mating members 62 are located in the same plane as, and project inwardly from, the front edges of the frame's top and bottom surfaces 64a and 64b. The mating members 62 are shaped and arranged to engage, or mate with, the airbag mating members 42 to join the airbag 16 to the retainer 18. In the preferred and illustrated embodiment, each of the retainer mating members 62 comprises a substantially planar T-shaped tab, with the top of the "T" forming the distal end of the mating member 62. In the completed airbag/retainer subassembly 14, the retainer mating members 62 extend into the fluid inlet 30 of the inflatable bag 24. (See FIG. 3).

In the assembly of the airbag/retainer subassembly 14, the retainer 18 is positioned within the fluid inlet 30 in such manner that the mating device 26 is adjacent the front surface of the frame 64. This positioning may be accomplished by inserting the retainer "sideways" into the fluid inlet 30 and then manipulating it into the illustrated "upright" orientation. Alternatively, if the bag 24 and the mating device 26 are sufficiently flexible, they may be "stretched over" the retainer 18. In either event, the airbag mating members 42 are engaged, or mated, with the retainer mating members 62 to join the airbag 16 to the retainer 18 in a predetermined alignment. In this predetermined alignment, the retainer rivet-receiving apertures 68 align with the airbag rivet-receiving apertures 38. Thus, the mating of the airbag mating members 42 with the retainer mating members 62 simultaneously aligns the relevant coupling components of the airbag 16 and the retainer 18.

The reaction device 12 forms a container 70 which, in the completed airbag assembly 10, at least partially encloses the airbag/retainer subassembly 14. Thus, in the illustrated and preferred embodiment, the reaction device 12 constitutes a reaction can. However, other forms of reaction devices, such as reaction plates, are possible with, and contemplated by, the present invention.

The reaction device 12 comprises a wall structure forming the container 70. The wall structure includes (in the illustrated orientation) a top wall 72, a bottom wall 74, side walls 76, and a rear wall 78. The front edges of the top wall 72, the bottom wall 74, and the side walls 76 define a front opening 80 sized and shaped to receive the airbag/retainer subassembly 14. Thus, in the illustrated and preferred embodiment, the front opening 80 is roughly rectangular in configuration and has top and bottom edges 80a and 80b substantially longer than its side edges.

The reaction device 12 includes a plurality of circular rivet-receiving apertures 82. In the preferred and illustrated embodiment, the apertures 82 are located on the top wall 72 and the bottom wall 74. Additionally, the rivet-receiving apertures 82 are located rearward of the front opening 80, preferably approximately one-half the distance between the front opening 80 and the rear wall 78.

In the completed airbag assembly 10, the rivet-receiving apertures 82 align with the rivet-receiving apertures 38 of the airbag 16 and the rivet-receiving apertures 68 of the retainer 18. In this manner, the rivets 19 may extend through the apertures 38, 68 and 82 to couple the airbag 16 and the retainer 18 to the reaction device 12. Thus, in the completed airbag assembly 10, the retainer 18 is located rearward of the front opening 80 of the reaction device 12, preferably approximately one-half the distance between the front opening 80 and the rear wall 78. (See FIG. 1).

The reaction device 12 further includes mating members 84 which form a cradle. During the assembly of the airbag assembly 10, the mating members 84 (or the cradle formed thereby) engage the airbag/retainer subassembly 14 and align the airbag/retainer subassembly 14 in a predetermined orientation relative to the reaction device 12. In this predetermined orientation, the rivet-receiving apertures 82 are aligned with the aligned rivet-receiving apertures 38 and 68 of the airbag/retainer subassembly 14. Thus, the engagement of the airbag/retainer subassembly 14 with the cradle simultaneously aligns the relevant coupling components so that preliminary alignment procedures are not necessary.

In the illustrated and preferred embodiment, the mating members comprise "cut-out" tabs formed in one piece with the wall structure of the reaction device 12. Specifically, a pair of inwardly projecting tabs are provided on each of the top wall 72 and the bottom wall 74 of the reaction device 12. In the completed airbag assembly 10, the tabs engage selected portions of the mating device's base member 40 and the bag fabric surrounding these selected portions. (See FIG. 1.)

To assemble the airbag assembly 10, the airbag/retainer subassembly 14 is formed outside of the reaction device 12. (See FIG. 3.) Thereafter, the airbag/retainer subassembly 14 is inserted through the front opening 80 of the reaction device 12 and is positioned so that it engages the cradle formed by the mating members 84. (See FIG. 1.) This engagement results in an alignment of the rivet-receiving apertures 82 of the reaction device 12 with the already aligned rivet apertures 38 and 68 of the airbag 16 and the retainer 18. The rivets 19 may be inserted through these aligned apertures and appropriately locked (or "upset") to couple the airbag/retainer subassembly 14 to the reaction device 12. The cover 22 may then be coupled to the reaction device 12 to close the front opening 80. Before, during, or after these coupling steps, the inflator 20 may be coupled to the reaction device 12 in a suitable manner.

One may now appreciate that the present invention provides an airbag assembly having a design which eliminates the need for preliminary alignment procedures when coupling an airbag and a retainer to a reaction device. Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. Apparatus comprising an airbag/retainer subassembly for use in forming an airbag assembly;

said airbag/retainer subassembly comprising an airbag and a retainer joined with said airbag;

said airbag including an inflatable bag which has a mouth defining a fluid inlet and a mating device incorporated into said mouth;

said mating device including airbag mating members which extend out of said mouth;

said retainer comprising a base member and retainer mating members which are attached to, and extend away from, said base member; and said airbag mating members being mated with said retainer mating members and thereby joining said airbag with said retainer in a predetermined alignment and thereby forming said airbag/retainer subassembly.

2. Apparatus as set forth in claim 1, wherein said airbag mating members and said retainer mating members extend into said fluid inlet.

3. Apparatus as set forth in claim 1, wherein said mating device comprises a ring-shaped base member which is incorporated into said mouth of said airbag and wherein said airbag mating members are attached to said ring-shaped base member.

4. Apparatus as set forth in claim 1, wherein said inflatable bag has a plurality of apertures which are disposed at predetermined locations relative to said airbag mating members and wherein said base member of said retainer has a plurality of apertures which are disposed at predetermined locations relative to said retainer mating members and which are aligned with said apertures of said inflatable bag.

5. Apparatus as set forth in claim 3, wherein said airbag mating members and said retainer mating members extend into said fluid inlet.

6. Apparatus as set forth in claim 5, wherein said base member of said retainer comprises a continuous frame; and wherein said retainer mating members extend inwardly from said continuous frame.

7. Apparatus as set forth in claim 6, wherein said ring-shaped base member of said mating device has a substantially rectangular configuration and wherein said continuous frame of said retainer has a substantially rectangular configuration.

8. Apparatus as set forth in claim 7, wherein each of said retainer mating members comprises a T-shaped tab; and wherein each of said airbag mating members defines a mating slot which mates with one of said T-shaped tabs to join said airbag with said retainer.

9. Apparatus as set forth in claim 8, wherein each of said airbag mating members includes a proximal section which extends inward from said ring-shaped base member and a distal section which extends from said proximal member at an angle and which defines one of said mating slots.

10. Apparatus as set forth in claim 9, wherein said inflatable bag has a plurality of apertures which are disposed at predetermined locations relative to said airbag mating members and wherein said continuous frame has a plurality of apertures which are disposed at predetermined locations relative to said retainer mating members and which are aligned with said apertures of said inflatable bag.

11. Apparatus as set forth in claim 3, wherein said airbag mating members are formed in one piece with said ring-shaped base member of said mating device.

12. Apparatus as set forth in claim 11, wherein said mating device consists essentially of a one-piece, molded plastic article.

13. Apparatus as set forth in claim 12, wherein said one-piece molded plastic article is made of nylon.

14. A method of forming an airbag assembly comprising the steps of:
providing an airbag including an inflatable bag which has a mouth defining a fluid inlet and airbag mating members which extend away from the mouth;
providing a retainer including a base member and retainer mating members which are attached to the base member and which are configured to mate with the airbag mating members;
mating the airbag mating members with the retainer mating members to join the airbag with the retainer in a predetermined alignment to form an airbag/retainer subassembly;
providing a reaction device;
positioning the airbag/retainer subassembly in a predetermined orientation relative to the reaction device; and
coupling the airbag/retainer subassembly to the reaction device.

15. A method as set forth in claim 14, wherein said step of providing the reaction device includes the step of providing the reaction device with a cradle configured to engage the airbag/retainer subassembly and align the airbag/retainer subassembly in the predetermined orientation; and wherein said step of positioning the airbag/retainer subassembly includes engaging the airbag/retainer subassembly with the cradle.

16. A method as set forth in claim 14, wherein said step of providing the reaction device comprises the step of providing a wall structure forming a container which defines a front opening; and wherein said step of positioning the airbag/retainer subassembly includes inserting the airbag/retainer subassembly through the front opening into the container.

17. A method as set forth in claim 16 wherein said step of providing the reaction device includes the step of providing the container with a cradle configured to engage the airbag/retainer subassembly and to align the airbag/retainer subassembly in the predetermined orientation; and wherein said step of positioning the airbag/retainer subassembly includes engaging the airbag/retainer subassembly with the cradle.

18. A method as set forth in claim 14, wherein:
said step of providing the airbag includes the step of providing the inflatable bag with apertures which are disposed at predetermined locations relative to the airbag mating members;
said step of providing the retainer includes the step of providing the base member with apertures which are disposed at predetermined locations relative to the retainer mating members and which are arranged to align with the apertures in the inflatable bag in the airbag/retainer subassembly; and
said step of mating the airbag mating members with the retainer mating members simultaneously aligns the apertures in the inflatable bag with the apertures in the retainer.

19. A method as set forth in claim 18, wherein:
said step of providing the reaction device comprises the step of providing apertures in the reaction device which are arranged to align with the aligned apertures in the inflatable bag and the retainer when the airbag/retainer subassembly is positioned in the predetermined orientation;
said step of positioning the airbag/retainer subassembly includes aligning the apertures in the reaction device with the aligned apertures in the inflatable bag and the retainer; and
said step of coupling the airbag/retainer subassembly to the reaction device comprises the step of inserting fasteners through the aligned apertures of the inflatable bag, the retainer, and the reaction device.

20. A method as set forth in claim 19, wherein:
said step of providing the reaction device includes the step of providing the reaction device with a cradle configured to engage the airbag/retainer subassembly and align the airbag/retainer subassembly in such a manner that apertures of the reaction device are aligned with the aligned apertures of the inflatable bag and the retainer;
said step of positioning the airbag/retainer subassembly includes engaging the airbag/retainer subassembly with the cradle; and
said step of engaging the airbag/retainer subassembly with the cradle simultaneously aligns the apertures in the reaction device with the aligned apertures in the inflatable bag and the retainer.

21. An airbag assembly comprising a reaction device and an airbag/retainer subassembly coupled to said reaction device:
said reaction device comprising a cradle which engages said airbag/retainer subassembly and supports said airbag/retainer subassembly in a predetermined orientation relative to said reaction device;
said airbag/retainer subassembly comprising an airbag and a retainer joined with said airbag;
said airbag including an inflatable bag which has a mouth defining a fluid inlet and a mating device incorporated into said mouth;
said mating device including airbag mating members which extend out of said mouth;
said retainer comprising a base member and retainer mating members which extend away from said base member; and said airbag mating members being mated with said retainer mating members and thereby joining said airbag with said retainer in a predetermined alignment and forming said airbag/retainer subassembly.

22. An airbag assembly as set forth in claim 21, wherein said reaction device comprises a wall structure coupled to said airbag/retainer subassembly and wherein said cradle is formed in one piece with said wall structure.

23. An airbag assembly as set forth in claim 22, wherein said wall structure forms a container which at least partially encloses said airbag/retainer subassembly.

24. An airbag assembly as set forth in claim 23, wherein:
said inflatable bag has a plurality of apertures which are disposed at predetermined locations relative to said airbag mating members;
said base member of said retainer has a plurality of apertures which are disposed at predetermined locations relative to said retainer mating members and which are aligned with said apertures of said inflatable bag;
said wall structure of said reaction device has a plurality of apertures which are disposed at predetermined locations relative to said cradle and which are aligned with said apertures of said inflatable bag and with said apertures of said base member of said retainer; and
said airbag assembly further comprises fasteners which extend through said aligned apertures of said inflatable bag, said base member of said retainer, and said wall structure of said reaction device.

25. An airbag assembly as set forth in claim 24, further comprising an inflator coupled to said reaction device, said inflator including an elongated cylindrical housing enclosing an inflation fluid.

26. An airbag assembly comprising a reaction device, an airbag, a retainer, and fasteners coupling said airbag and said retainer to said reaction device;
said airbag including an inflatable bag which has a mouth defining a fluid inlet and a mating device incorporated into said mouth;
said mating device including airbag mating members which extend out of said mouth;
said retainer comprising a base member and retainer mating members which are attached to, and extend away from, said base member;
said airbag mating members being mated with said retainer mating members;
said inflatable bag having a plurality of apertures which are disposed at predetermined locations relative to said airbag mating members;
said base member of said retainer having a plurality of apertures which are disposed at predetermined locations relative to said retainer mating members and which are aligned with said apertures of said inflatable bag;
said reaction device having a wall structure with a plurality of apertures which are aligned with said apertures of said inflatable bag and with said apertures of said base member of said retainer; and
said fasteners extending through said aligned apertures of said inflatable bag, said base member of said retainer, and said wall structure of said reaction device.

27. An airbag assembly as set forth in claim 26 further comprising an inflator coupled to said reaction device, said inflator including an elongated cylindrical housing enclosing an inflation fluid.

28. An airbag assembly as set forth in claim 27 wherein said wall structure forms a container which at least partially encloses said airbag.

29. An airbag assembly as set forth in claim 28 wherein said wall structure includes a rear wall and a set of walls having front edges which define a front opening opposite said rear wall; and wherein said retainer is located rearward of said front opening.

30. An airbag assembly as set forth in claim 29 wherein retainer is located approximately one-half the distance between said front opening and said rear wall.

* * * * *